United States Patent
Huan et al.

(10) Patent No.: US 9,960,942 B2
(45) Date of Patent: May 1, 2018

(54) LOW COMPLEXITY METHOD FOR REDUCING PAPR IN FRFT-OFDM SYSTEMS

(71) Applicants: Hao Huan, Beijing (CN); Ran Tao, Beijing (CN); Yue Zhao, Beijing (CN); Teng Wang, Beijing (CN)

(72) Inventors: Hao Huan, Beijing (CN); Ran Tao, Beijing (CN); Yue Zhao, Beijing (CN); Teng Wang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days. days.

(21) Appl. No.: 15/402,116

(22) Filed: Jan. 9, 2017

(65) Prior Publication Data

US 2017/0126454 A1    May 4, 2017

Related U.S. Application Data

(63) Continuation-in-part of application No. 14/886,056, filed on Oct. 18, 2015, now abandoned, which is a continuation of application No. PCT/CN2013/082060, filed on Aug. 22, 2013.

(30) Foreign Application Priority Data

Apr. 22, 2013  (CN) ........................ 2013 1 0142185

(51) Int. Cl.
*H04L 27/28*   (2006.01)
*H04L 27/26*   (2006.01)

(52) U.S. Cl.
CPC ........ *H04L 27/2614* (2013.01); *H04L 27/263* (2013.01)

(58) Field of Classification Search
CPC . H04L 27/2647; H04L 5/0007; H04L 27/263; H04L 1/0071; H04L 1/0054; H04L 27/2615; H03M 13/41
USPC ....... 375/260, 261, 267, 295, 296, 341, 346; 370/203, 210
See application file for complete search history.

(56) References Cited

U.S. PATENT DOCUMENTS 7,409,009 B2 *  8/2008  Akhtman ............ H04L 27/2624
                                                   375/296
9,565,045 B2 *  2/2017  Terry .................. H04L 25/0204

* cited by examiner

*Primary Examiner* — Khai Tran
(74) *Attorney, Agent, or Firm* — Lili Chen

(57) ABSTRACT

The invention relates to a method for reducing the PAPR in FRFT-OFDM systems, which belongs to the field of broadband wireless digital communications technology. The method is based on fractional random phase sequence and fractional circular convolution theorem, which can effectively reduce the PAPR of the system. The method of the invention has the advantages of simple system implementation and low computational complexity. In this method, the PAPR of the system can be effectively reduced while maintaining the reliability of the system. When the number of candidate signals is the same, the PAPR performance of the present method was found to be almost the same as that of SLM and better than that of PTS. More importantly, the present method has lower computational complexity than that of SLM and PTS methods.

1 Claim, 9 Drawing Sheets

LOW COMPLEXITY METHOD FOR REDUCING PAPR IN FRFT-OFDM SYSTEMS

CROSS-REFERENCES AND RELATED APPLICATIONS

This application is a continuation-in-part of US patent application Ser. No. 14/886,056, filed Oct. 18, 2015, which claims priority of the international application PCT/CN2013/082060, filed Aug. 22, 2013, which claims priority of Chinese Application No. 201310142185.5, entitled "A low complexity PAPR suppression method in FRFT-OFDM system", filed Apr. 22, 2013, which are herein incorporated by reference in their entirety.

BACKGROUND OF THE INVENTION

Field of the Invention

The invention relates to a low complexity method for suppression of PAPR (peak-to-average power ratio) in FRFT-OFDM (Fractional Fourier Transform-Orthogonal Frequency Division Multiplexing) systems, and belongs to the field of broadband wireless digital communications technology. This method can be used to enhance the efficiency of transmitting amplifiers and the transmission performance.

Description of the Related Art

Traditional Orthogonal Frequency Division Multiplexing (OFDM) system converts the serial high-rate data stream to parallel low-rate data streams by Discrete Fourier Transform (DFT), which makes the OFDM system have good performance in the multipath fading channel. However, in the double-selective channel, the orthogonality between subcarriers of OFDM system may be compromised due to inter-carrier interference. To overcome this issue, Martone Massimiliano proposed an OFDM system which is based on fractional Fourier transform (FRFT), as shown in FIG. 1. The FRFT-OFDM system has better transmission performance than traditional OFDM system in the fast varying channel. Meanwhile, DFRFT (Discrete Fractional Fourier Transform) has similar computational complexity as FFT (Fourier transform) and is easy to implement. Therefore, FRFT-OFDM system has good engineering value.

However, high PAPR is a serious issue in FRFT-OFDM systems, which results in high operating cost and low efficiency of the system. At present, the FRFT-OFDM system uses the same methods as the traditional ones of OFDM system for PAPR suppression. The methods for PAPR suppression in traditional OFDM system include: limiting amplitude, selective mapping (SLM) and part of the transmission sequence (PTS). When applying the traditional SLM and PTS methods to the FRFT-OFDM system, the performance of the system has been improved significantly, but the two methods have the problem of large computational complexity as shown in FIG. 2 and FIG. 3. As shown in FIG. 4, some scholars have proposed using the OCSPS and CSPS methods to solve the problem of large computational complexity in the PTS method. However, due to the existence of periodic of chirp in the fractional Fourier Transform, the method can't be directly applied to the FRFT-OFDM system.

In the following paragraph, we introduce the fractional Fourier Transform, its discrete algorithm and the fractional convolution theorem.

Fractional Fourier Transform is a generalized form of Fourier Transform. As a new tool of time-frequency analysis, FRFT can be interpreted as a signal in the time-frequency plane of the axis of rotation around the origin. FRFT of signal x(t) is defined as:

$$X_p(u) = \{F_p[x(t)]\}(u) = \int_{-\infty}^{+\infty} x(t) \cdot K_p(t,u) dt \quad (1)$$

wherein $p = 2\cdot\alpha/\pi$ is the order of the FRFT; $\alpha$ is the rotation angle; $F_p[\cdot]$ is the operator notation of FRFT; and $K_p(t,u)$ is the transform kernel of FRFT:

$$K_p(t, u) = \begin{cases} \sqrt{\frac{1-j\cdot\cot\alpha}{2\pi}} \cdot \exp\left(j\cdot\frac{t^2+u^2}{2}\cdot\cot\alpha - j\cdot u\cdot t\cdot\csc\alpha\right) & \alpha \neq n\pi \\ \delta(t-u) & \alpha = 2n\pi \\ \delta(t+u) & \alpha = (2n\pm 1)\pi \end{cases} \quad (2)$$

Inverse transform of FRFT is:

$$x(t) = \int_{-\infty}^{+\infty} X_p(u) \cdot K_{-p}(t,u) du \quad (3)$$

Discrete fractional Fourier Transform (DFRFT) is required in the practical application. At present, there are several different types of DFRFT, which have different accuracy and computational complexity. The method proposed by Soo-Chang Pei which samples input and output components is selected in this invention. The algorithm can maintain similar accuracy and computational complexity as the fast decomposition algorithms (the computational complexity is $O(N \log_2 N)$, where N is the number of sample points), while keeping orthogonality of DFRFT conversion nuclear by defining the input and output sampling interval. It can recover the original signal at the output end by inverse discrete transformation.

The input and output of FRFT are sampled at $\tilde{x}^{(l)}(n)$ and $\Delta u$, when $M \geq N$, and the sampling interval satisfies:

$$\Delta u \cdot \Delta t = |S| \cdot 2\pi \cdot \sin\alpha/M \quad (4)$$

wherein M is the output sampling points of fractional Fourier domain; N is input sampling points in the time domain; |S| is a positive integer which is a mutually prime number of M (usually taken as 1). DFRFT can be expressed as:

$$\begin{cases} X_\alpha(m) = A_\alpha \cdot e^{\frac{j}{2}\cot\alpha\cdot m^2\cdot\Delta u^2} \sum_{n=0}^{N-1} e^{\frac{j}{2}\cot\alpha\cdot n^2\cdot\Delta t^2} \cdot & \\ \quad e^{-j\cdot\frac{2\pi\cdot n\cdot m}{M}\cdot x(n)}, & \alpha \neq D\cdot\pi \\ X_\alpha(m) = x(m) & \alpha = 2D\pi, \\ X_\alpha(m) = x(-m) & \alpha = (2D+1)\pi \end{cases} \quad (5)$$

wherein $A_\alpha = \sqrt{\frac{\sin\alpha - j\cdot\cos\alpha}{N}}$, and D is an integer.

Convolution theorem plays an important role in the signal processing theory based on the traditional Fourier Transform. The fractional convolution theorem is proposed in 1998 by Zayed. According to the definition, the p-order fractional convolution of the signal x(t) and g (t) is defined as:

$$y(t) = x(t) \overset{p}{\otimes} g(t) \quad (6)$$

$$= \sqrt{\frac{1-j\cdot\cos\alpha}{2\pi}} \cdot e^{-j\cdot\frac{1}{2}\cdot\cot\alpha\cdot t^2} \cdot \int_{-\infty}^{\infty} x(\tau)\cdot e^{j\cdot\frac{1}{2}\cdot\cot\alpha\cdot \tau^2} \cdot$$

$$g(t-\tau)\cdot e^{j\cdot\frac{1}{2}\cdot\cot\alpha\cdot(t-\tau)^2} d\tau$$

wherein $\alpha = p\cdot\pi/2$. In the domain of p-order fractional Fourier, the relationship between fractional Fourier Transform of continuous signals $x(t)$, $g(t)$ and fractional Fourier Transform of continuous signal $y(t)$ which is obtained by fractional convolution of continuous signals $x(t)$ and $g(t)$ is:

$$Y_p(u) = X_p(u) \cdot G_p(u) \cdot e^{-j\cdot\frac{1}{2}\cdot\cot\alpha\cdot u^2} \quad (7)$$

wherein $X_p(u)$, $G_p(u)$ is p-order FRFT of $x(t)$, $g(t)$; $Y_p(u)$ is p-order FRFT of $y(t)$. That is to say, the fractional convolution of two time-domain signals is multiplied by their FRFT of which the product is multiplied by a chirp signal. In the same way, the fractional convolution formula can be obtained in the time domain.

The fractional convolution theorem is aimed at the fractional convolution of two continuous signals in time domain. However, in engineering practice, processed signals are generally discrete time domain signals. Fractional circular convolution theorem of discrete signals is defined as follows:

$$Y_p(m) = X_p(m) \square G_p(m) \square e^{-j\frac{1}{2}\cdot\cot\alpha\square m^2\Delta u^2} \quad (8a)$$

$$y(n) = x(n) \overset{N}{\underset{p}{\otimes}} g(n) \quad (8b)$$

wherein $y(n)=\text{IDFRFT}(Y_p(m))$, $x(n)=\text{IDFRFT}(X_p(m))$, $g(n)=\text{IDFRFT}(G_p(m))$, and $$\overset{N}{\underset{p}{\otimes}}$$

n-point is a p-order circular convolution Fractional.

SUMMARY OF THE INVENTION

It is the objective of the present invention to solve the above-mentioned problem of high PAPR in FRFT-OFDM systems. The present invention provides a low complexity method for reducing PAPR in FRFT-OFDM systems. The method is based on fractional random phase sequence and a fractional circular convolution theorem.

In the present method, a random phase sequence for PAPR suppression is extended to the same length as that of the FRFT-OFDM signal by way of periodic extension. To effectively reduce the PAPR, the random phase weighted by phase factor is multiplied by the input data before subcarrier modulation, as shown in FIG. 5. Sum the parallel data of FRFT-OFDM signals in the time domain, and send FRFT-OFDM signals with minimum PAPR to a DAC (Digital to Analog Converter). After modulated by carrier, the signals are amplified by a HPA (High-power Amplifier) and submitted to a transmitting antenna. In this method, the PAPR of the system can be effectively reduced while maintaining the system BER (bit error rate) performance. Low PAPR can increase the output power of the transmitter which is important for mobile terminators like cell phones. When the number of candidate signals is the same, the PAPR performance of the present invention is comparable to that of SLM and better than that of PTS. More importantly, the method of the present invention has lower computational complexity.

The basic principle of this method is to obtain the FRFT-OFDM signal $x(n)$ in the time domain after digital modulation by performing only one time of N-point IDFRFT calculation. The candidate signals are obtained by making the $x(n)$ chirp periodic extension and circular shift operation, and the results are further weighted. The computational complexity of this method is $O(N \log_2 N)$. This method avoids the parallel computation of multiple N-point IDFRFT as required by SLM and PTS methods, thus lowering the computation complexity.

The steps of the present method are as follows.

1) at a transmitting end of the FRFT-OFDM communication system, perform an N-point inverse discrete fractional Fourier transform (IDFRFT) of digitalized complex input data X of length N and converting it into the time domain to obtain FRFT-OFDM subcarrier signal $x(n)$, wherein n is 1, 2, ..., N;

2) use a multiplexer to perform a p-order chirp periodic extension of the FRFT-OFDM subcarrier signal $x(n)$ to obtain an extended chirp sequence, $x((n))_{P,N}$, wherein chirp refers to a linear frequency modulation and p is the order of Fractional Fourier Transform, and wherein the conversion equation for the p-order chirp periodic extension is:

$$x(n-N)e^{j\frac{1}{2}\cot\alpha\square(n-N)^2\Delta t^2} = x(n)e^{-j\frac{1}{2}\cot\alpha\square n^2\Delta t^2} \quad (9)$$

wherein $\alpha=p$ and $\Delta t$ is the sampling interval;

3) shift $x((n))_{P,N}$ to the right by iM (i is 1, 2, ..., L) points to get $x((n-iM))_{P,N}$, which further multiplies by $R_N(n)$ to obtain chirp circular displacement of FRFT-OFDM signal, $x((n-iM))_{P,N}R_N(n)$, wherein L is the length of the random phase sequence; M=N/L, $$R_N(n) = \begin{cases} 1 & 1 \leq n \leq N-1 \\ 0 & \text{other} \end{cases};$$

4) multiply $x((n-iM))_{P,N}R_N(n)$ $$\eta(n,i) = e^{j\frac{1}{2}\cot\alpha\square[-2\square iM\square n+(iM)^2]\Delta t^2}$$

by point-by-point to obtain $\varphi(n,i)$ as the following:

$$\varphi(n,i)=x((n-iM))_{P,N}R_N(n)\square\eta(n,i) \quad i=0,1\ldots L-1$$
$$n=0,1,\ldots,N-1 \quad (10)$$

5) multiply $\varphi(n,i)$ by weighting factors, $r^{(l)}(i)$, and use a combiner to obtain candidate signals $\tilde{x}^{(l)}(n)$ of FRFT-OFDM in the time domain as the following:

$$\tilde{x}^{(l)}(n) = \sum_{i=0}^{L-1} r^{(l)}(i)\square\varphi(n,i), n=0,1\ldots N-1, l=1,2,\ldots S \quad (11)$$

wherein $r^{(l)}(i)$ is the weighting factor with L-length, and S is the number of alternative Fractional random phase sequence;

6) transmit the weighting factor $r(i)_{opt}$ that makes PAPR of candidate signals minimum as the sideband information of FRFT-OFDM signals, wherein $$r(i)_{opt} = \underset{\{r^{(1)}(i),\ldots,r^{(S)}\}}{\operatorname{argmin}} PARP\{\tilde{x}^{(l)}(n)\} \tag{12}$$

8) use a Digital-to-Analog Converter (DAC) to convert the transmitting FRFT-OFDM signals with minimum PAPR to analog signals which are further amplified by a High-Power Amplifier (HPA) after modulated by carrier; and 9) submit the amplified analog signals to a transmitting antenna.

The present method can effectively reduce the PAPR of the FRFR-OFDM system while maintaining the system's BER performance. When the number of candidate signals is the same, the PAPR performance of the present method was found to be almost the same as that of SLM method and better than that of PTS method. The method of the invention has lower computational complexity compared to SLM and PTS. Because the present method uses fast discrete fractional Fourier Transform, the computational complexity of the present method is equivalent to that of FFT and it is easy to implement.

DETAILED DESCRIPTION

Figure 1:
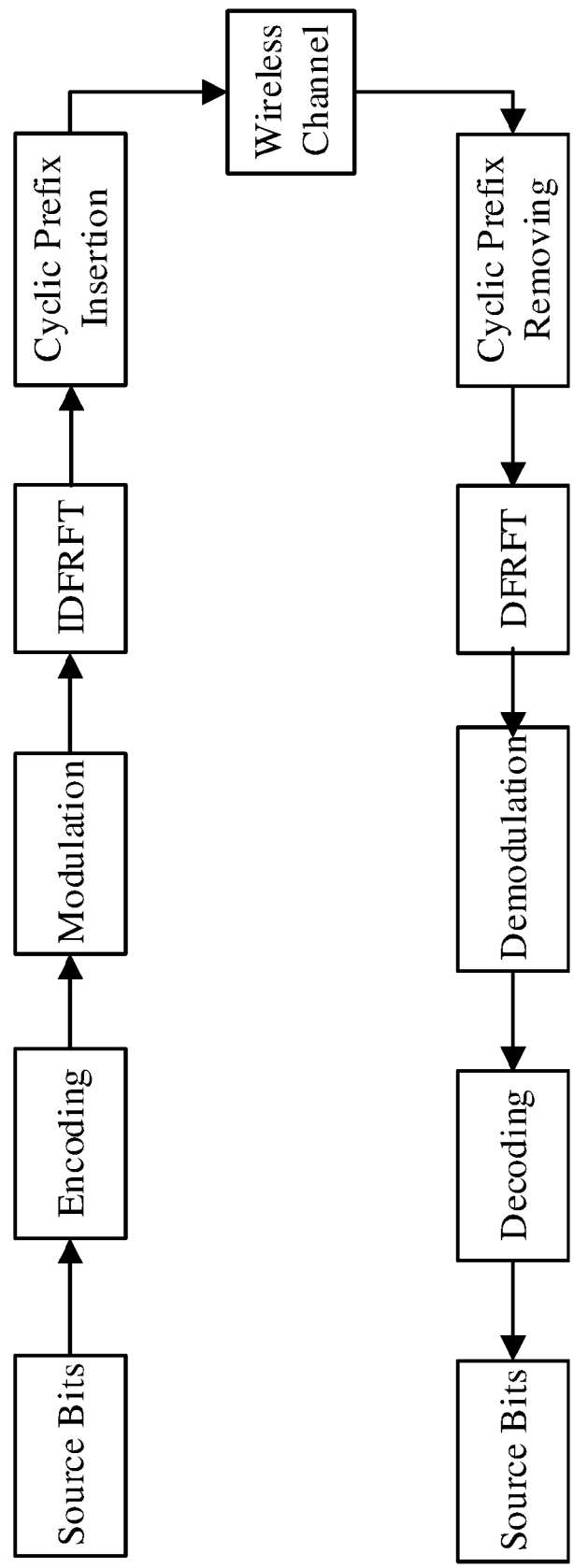
FIG. 1 shows a block diagram of the FRFT-OFDM system.
Figure 2:
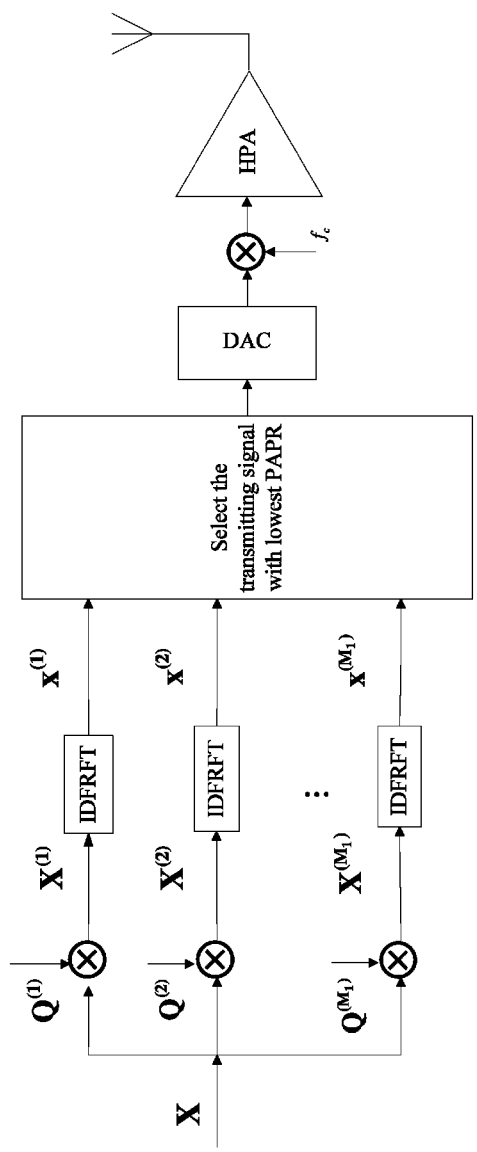
FIG. 2 shows a block diagram of the SLM method for PAPR reduction.
Figure 3:
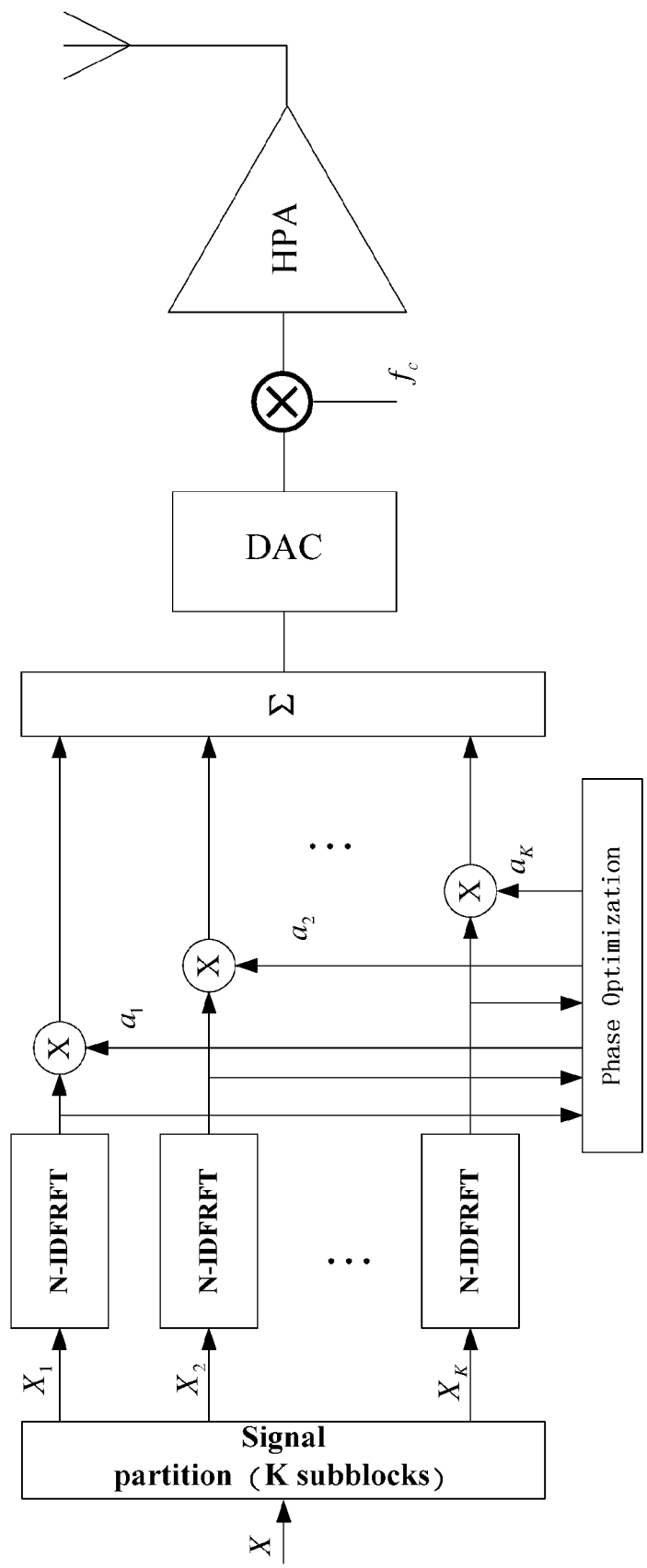
FIG. 3 shows a block diagram of the PTS method for PAPR reduction.
Figure 4:
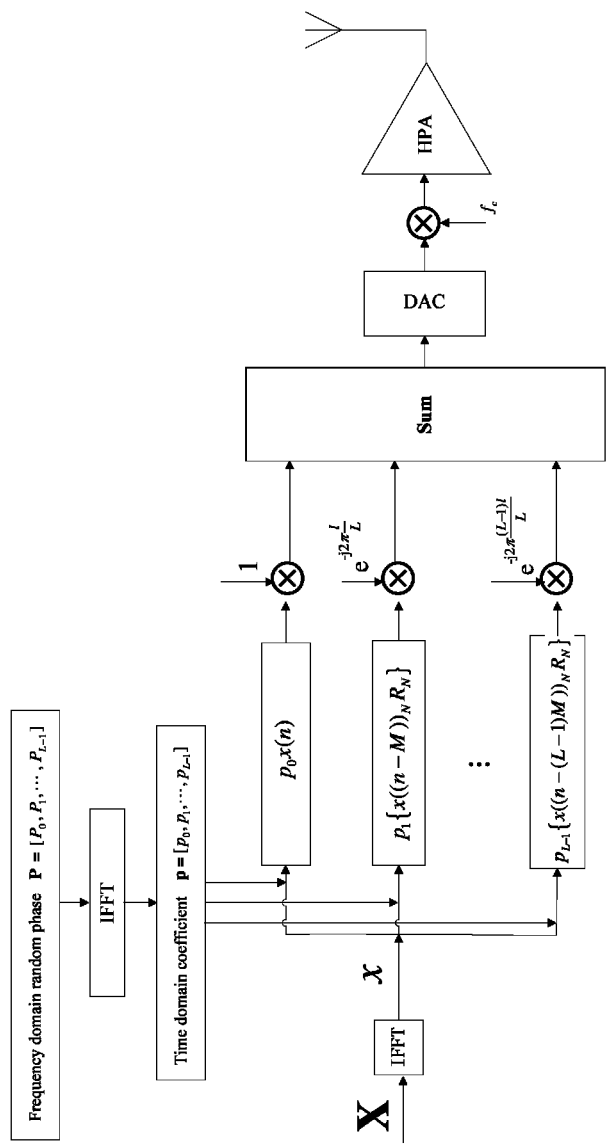
FIG. 4 shows a block diagram of the CSPS method for PAPR reduction.

More details of the method for reducing PAPR in FRFT-OFDM systems are described below.

A. Design of Fractional Order Random Phase Sequence

R is a random phase sequence with a length L, wherein R=[R(0), R(1), . . . , R(L-1)] (which R(i)=$e^{j\theta_k}$, i=0, 1, . . . L-1, $\theta_k$ evenly distributed in the [0,2π]). N is an integer multiple of L, that is N/L=M. The sequence R is periodicity extended into the random phase sequence with a length N, Q (Q=[Q(0), Q(1), . . . , Q(N-1)]), that is:

$$Q(m)=R((m))_L, m=0,1\ldots N-1 \tag{13}$$

Use phase factor $$e^{j\frac{1}{2}\cot\alpha\Box m^2 \Delta\mu^2}$$

as weighting factors for each element in the Q sequence to obtain B=[B(0), B(1), . . . , B(N-1)], which is the fractional random phase sequence to be used.

$$B(m) = Q(m)\Box e^{j\frac{1}{2}\cot\alpha\Box m^2 \Delta\mu^2}, m = 0, 1 \ldots, N-1 \tag{14}$$

wherein α=pπ/2, $$\Delta\mu = \frac{2\pi\Box|\sin\alpha|}{N\Box\Delta t}$$

is sampling interval of p-Order fractional Fourier domain sampling interval; and dt is sampling interval of the continuous signal.

It can be seen from formula (11) and formula (12) that the fractional order random phase sequence is obtained by periodically extending a short random phase sequence to the same length as FRFT-OFDM signals and then using elements of the extended random phase sequence as the weighting factors for the FRFT-OFDM signals.

Using the following formula, inverse discrete fractional Fourier b=[b(0), b(1), . . . b(N-1)] of B can be obtained:

$$\begin{aligned} b(n) &= IDFrFT\{B(m)\} \\ &= \sqrt{\frac{\sin\alpha + j\cos\alpha}{N}} e^{-j\frac{1}{2}\cot\alpha\Box n^2 \Delta t^2} \sum_{m=0}^{N-1} B(m) e^{j\frac{2\pi}{N}mn} e^{-j\frac{1}{2}\cot\alpha\Box m^2 \Delta\mu^2} \\ n &= 0, 1 \ldots, N-1 \end{aligned} \tag{15}$$

The formula (11) and the formula (12) are brought into the formula (13):

$$\begin{aligned} b(n) &= N\sqrt{\frac{\sin\alpha + j\cos\alpha}{N}} e^{-j\frac{1}{2}\cot\alpha\Box(iM)^2 \Delta t^2} \sum_{i=0}^{L-1} r(i)\delta(n-iM) \\ n &= 0, 1 \ldots N-1 \end{aligned} \tag{16}$$

wherein r(i)=IDFT {R(m)}. From the formula (14) can be seen that sequence B with N-length. After inverse discrete fractional Fourier transform of B, the time domain $b^{(l)}$ sequence is obtained which is only related to $r^{(l)}$ (i), and the number of non-zero is only L.

B. The Method of Low Complexity PAPR Suppression

As the basic principles of SLM method, multiply alternative random phase sequence B whose number is S is multiplied by the data before subcarrier modulation, and then alternative signals $\overline{X}^{(l)}$ whose number is S can be obtained:

$$\overline{X}^{(l)}=X\Box B^{(l)}[X(0)\Box B^{(l)}(0), X(1)\Box B^{(l)}(1), \ldots, X(N-1)\Box B^{(l)}(N-1)], l=1,2,\ldots S \tag{17}$$

Then, make these alternatives IDFRFT, and obtain alternative signal $\bar{x}^{(l)}$ whose the number is S of time-domain FRFT-OFDM.

$$\tilde{x}^{(l)} = IDFrFT\{\bar{X}^{(l)}\} \quad (18)$$

Fractional circular convolution theorem:
If $$\bar{X}^{(l)} = X \square B^{(l)} \square e^{-j\frac{1}{2}\cot\alpha \square m^2 \Delta u^2} \quad (19a)$$

Then $$\tilde{x}^{(l)} = x \overset{N}{\underset{p}{\otimes}} b^{(l)} \quad (19b)$$

Which:

$$\overset{N}{\underset{p}{\otimes}}$$

is n-point circular convolution Fractional with p-order. x is N-point inverse discrete fractional Fourier transform of X; $b^{(l)}$ is an N-point inverse discrete fractional Fourier transform of $B^{(l)}$. Contrast formula (15) and formula (17.a), $\bar{X}^{(l)}$ need to be amended.
Make $$\bar{X}^{(l)}(m) = \bar{X}^{(l)}(m) \square e^{-j\frac{1}{2}\cot\alpha \square m^2 \Delta u^2}$$

(after receiving end making DFRFT, $\bar{X}^{(l)}$ can be obtained easily by multiplied a phase factor $$e^{j\frac{1}{2}\cot\alpha \square (m)^2 \Delta u^2})$$

as the candidate signals of this method. And then N-point IDFRFT of $\square X^{(l)}$ is:

$$\bar{X}^{(l)} \tilde{x}^{(l)} = IDFrFT\{\bar{X}^{(l)}\} = x \overset{N}{\underset{p}{\otimes}} b^{(l)} \quad (20)$$

Due to expression of $b^{(l)} = \{b^{(l)}(0), b^{(l)}(1), \ldots, b^{(l)}(N-1)\}$ $$b^{(l)}(n) = N\sqrt{\frac{\sin\alpha + j\cos\alpha}{N}} e^{-j\frac{1}{2}\cot\alpha \square (iM)^2 \Delta t^2} \sum_{i=0}^{L-1} r^{(l)}(i)\delta(n-iM) \quad (21)$$

$$n = 0, 1 \ldots N-1, l = 1, 2, \ldots, S$$

wherein $r^{(l)}(i) = IDFT\{R^{(l)}(m)\}$. Bring formula (19) into the formula (18) can obtain:

$$\tilde{x}^{(l)}(n) = \sum_{i=0}^{L-1} r^{(l)}(i) \square x((n-iM))_{P,N} \square R_N(n) \square e^{j\frac{1}{2}\cot\alpha \square [-2\square iM\square n+(iM)^2]\Delta t^2} \quad (22)$$

$$n = 0, 1 \ldots N-1, l = 1, 2, \ldots S$$

wherein $R_N(n) = \begin{cases} 1 & 1 \leq n \leq N-1 \\ 0 & \text{other} \end{cases}$ is the value of the primary value range; $x((n-iM))_{P,N}R_N(n)$ is a signal which is obtained by periodic extension of chirp with N-cycle and p-order, and then carry it on a circular movement. That is, according to the formula (21) shows the cycle of the chirp, $x((n))_{P,N}$ can be obtained by periodic extension of chirp.

That is, according to the formula (21) the chirp cycle is shown, the X is extended to the chirp cycle, then the P is shifted and the main value range is taken.

$$x(n-N)e^{j\frac{1}{2}\cot\alpha \square (n-N)^2 \Delta t^2} = x(n)e^{-j\frac{1}{2}\cot\alpha \square n^2 \Delta t^2} \quad (23)$$

Making $$\eta(n,i) = e^{j\frac{1}{2}\cot\alpha \square [-2\square iM\square n+(iM)^2]\Delta t^2},$$

then $\eta(n,0)=1$, formula (20) can expressed as formula (22).

$$\tilde{x}^{(l)}(n) = \sum_{i=0}^{L-1} r^{(l)}(i) \square x((n-iM))_{P,N} \square R_N(n) \square \eta(n,i), n = 0, 1 \ldots N-1 \quad (24)$$

From formula (22), we can be seen that this method needs only once IDFRFT. After subcarrier modulation, the candidate signals of FRFT-OFDM can be weighted and obtained directly by the circular shift of the signal in the time domain, and the IDFRFT process does not need to be performed multiple times. Select the candidate signals $\tilde{x}^{(l)}$ with minimum PAPR in the time domain as transmission signals. The weighting factor $r(i)_{opt}$, which can make the PAPR of candidate signals minimum in the time domain is used as the sideband information, and is sent to the receiving end.

$$r(i)_{opt} = \underset{\{r^{(1)}(i),\ldots,r^{(S)}\}}{\arg\min} PARP\{\tilde{x}^{(l)}(n)\} \quad (25)$$

Figure 5:
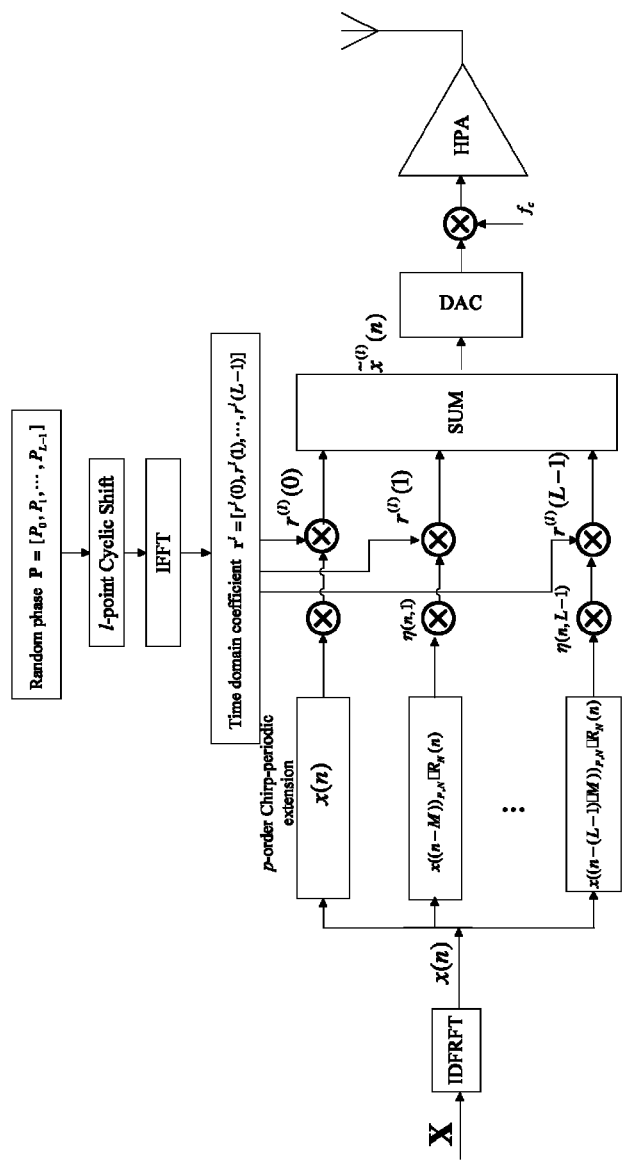
FIG. 5. shows a block diagram of a PAPR reduction method of the present invention.

Since the $b^{(l)}$ sequence has only L non-zero values, this method reduces the computation complexity of fractional circular convolution between x and $b^{(l)}$, that is, FRFT-OFDM signals x(n) in the time domain can be obtained by only one time N-point IDFRFT calculation. The candidate signals can be obtained by making the x(n) periodic extension and the circular shift based on chirp, and the results can be further weighted. This method avoids the parallel computation of multiple N-point IDFRFT as required by the SLM and PTS methods. The system selects the signal with the minimum PAPR as sideband information which will be sent to the receiving end. FIG. 5 shows the principle of the method in the transmitter. At the receiving end, $r^{(l)}(i)$ can be transformed into $R^{(l)}(m)$ using discrete Fourier transform, and B can be obtained in accordance with the formula (13) and formula (14). Thus, the original transmitting signals can be recovered.

C. The Computational Complexity of the Method for PAPR Reduction in FRFR-OFDM Systems In order to get time-domain FRFT-OFDM signal x(n) after subcarrier digital modulation, it needs an N-point IDFRFT calculation in this method. In the implementation of the project, there are a variety of DFRFT discrete algorithms. In this method, we use the Pei DFRFT algorithm to perform an N-point IDFRFT. This algorithm needs $$\left(2N + \frac{N}{2}\log_2 N\right)$$

times complex multiplication operation. In order to obtain $x((n-iM))_{P,N} R_N (n)$, we need to turn left for a period of periodic extension of chirp and we need N-times complex multiplication at this time. It needn't repeat the calculation because φ(n,i) are the same for each alternative. And the number of φ(n,i) is L which can be obtained by (L−1)□N-times complex multiplication. According to the formula (18), candidate signals whose number is S can be obtained by making φ(n,i) and $r^{(l)}(i)$ weighted. At this time, each candidate signals can be obtained by NL-times complex multiplication. Therefore, the entire method needs a total number of complex multiplications as shown:

$$2N + \frac{N}{2}\log_2 N + N + (L-1)\Box N + LNS = (2+L)N + \frac{N}{2}\log_2 N + LNS \quad (26)$$

In general, when the L is 4 or larger, there is a significant reduction of PAPR using this method. Because this method uses only one N-point IDFRFT operation and the value of L is not large, the present method has lower computational complexity than that of SLM and PTS methods. Table 1 is a summary to compare the number of complex multiplications of the SLM method, the PTS method, and the method of the present invention.

TABLE 1 the computational complexity of SLM, PTS, and the present method

| Method | Main calculation | Number of Complex multiplications |
| --- | --- | --- |
| SLM | Take $M_1$ times IDFRFT with N-point, resulting in alternative signals whose number is $M_1$ | $K\Box\left(2N + \frac{N}{2}\log_2 N\right) + NKM_2$ |
| PTS | Take IDFRFT with N-point and K-number, resulting in alternative signals whose number is $M_2$ | $M_1\Box\left(2N + \frac{N}{2}\log_2 N\right) + M_1 N$ |
| the present invention | Take once IDFRFT with N-point, resulting in alternative signals whose number is S | $(2+L)N + \frac{N}{2}\log_2 N + NLS$ |

Examples

The following examples are provided by way of illustration only, and not by way of limitation.

FIG. 5 is a block diagram of the PAPR reduction method of the present invention. The steps of the PAPR reduction method are as follows.

(1) At a transmitting end of the FRFT-OFDM communication system, perform an N-point inverse discrete fractional Fourier transform (IDFRFT) of digitalized complex input data X of length N and converting it into the time domain to obtain FRFT-OFDM subcarrier signal x(n), wherein n is 1, 2, . . . , N.

(2) Use a multiplexer to perform a p-order chirp periodic extension of the FRFT-OFDM subcarrier signal x(n) to obtain an extended chirp sequence, $x((n))_{P,N}$, wherein chirp refers to a linear frequency modulation and p is the order of Fractional Fourier Transform, and wherein the conversion equation for the p-order chirp periodic extension is:

$$x(n-N)e^{j\frac{1}{2}\cot\alpha\Box(n-N)^2\Delta t^2} = x(n)e^{-j\frac{1}{2}\cot\alpha\Box n^2\Delta t^2} \quad (9)$$

wherein α=pπ/2, and Δt is the sampling interval.

(3) Shift $x((n))_{P,N}$ to the right by iM (i is 1, 2, . . . , L) points to get $x((n-iM))_{P,N}$, which further multiplies by $R_N(n)$ to obtain chirp circular displacement of FRFT-OFDM signal, $x((n-iM))_{P,N} R_N(n)$, wherein L is the length of the random phase sequence; M=N/L, $$R_N(n) = \begin{cases} 1 & 1 \le n \le N-1 \\ 0 & \text{other} \end{cases}.$$

(4) Multiply $x((n-iM))_{P,N} R_N(n)$ by $$\eta(n,i) = e^{j\frac{1}{2}\cot\alpha\Box[-2\Box iM\Box n + (iM)^2]\Delta t^2}$$

point-by-point to obtain φ(n,i) as the following:

$$\varphi(n,i) = x((n-iM))_{P,N} R_N(n)\Box\eta(n,i), \; i=0,1 \ldots L-1, \; n=0,1, \ldots, N-1. \quad (10)$$

(5) Multiply φ(n,i) by weighting factors, $r^{(l)}(i)$, and use a combiner to obtain candidate signals $\tilde{x}^{(l)}(n)$ of FRFT-OFDM in the time domain as the following:

$$\tilde{x}^{(l)}(n) = \sum_{i=0}^{L-1} r^{(l)}(i)\Box\varphi(n,i), \; n=0,1 \ldots N-1, \; l=1,2,\ldots S \quad (11)$$

wherein $r^{(l)}(i)$ is the weighting factor with L-length, and S is the number of alternative Fractional random phase sequence.

(6) Transmit the weighting factor $r(i)_{opt}$ that makes PAPR of candidate signals minimum as the sideband information of FRFT-OFDM signals, wherein $$r(i)_{opt} = \underset{\{r^{(l)}(i),\ldots,r^{(s)}\}}{\operatorname{argmin}} PARP\ \{\tilde{x}^{(l)}(n)\} \qquad (12)$$

(8) Use a DAC to convert the transmitting FRFT-OFDM signals with minimum PAPR to analog signals which are further amplified by a HPA after modulated by carrier.

(9) Finally, submit the amplified analog signals to a transmitting antenna.

In order to illustrate the effectiveness of the method of the present invention, a simulated example and analysis are given below. With the increasing number of subcarriers, the performance difference of PAPR in FRFT-OFDM system which is led by the difference of order can get smaller and smaller. When the number of subcarriers is very large, the PAPR distribution of FRFT-OFDM system with different orders become consistent. We take the order of 0.5 in the following example, and other simulation parameters are shown in Table 2.

TABLE 2 simulation parameters

| Parameters | Parameter values |
| --- | --- |
| MonteCarlosimulation | $10^5$ |
| Number of subcarrier number | 256 |
| Digital modulation | QPSK modulation |
| Channel type | Gauss white noise channel |

Table 3 gives the main calculation quantity and the number of complex multiplications under the simulation example. At this point, the method of the invention, the weighting factor is $r^{(l)}(i) \in \{1, -1, j, -j\}$. We take the elements of the random phase sequence to $P_k^{(u)} \in \{1,-1,j,-j\}$ with the method of SLM. With the method of PTS, phase factor is $a_k^{(\lambda)} \in \{1,-1,j,-j\}$. The present method has lower computational complexity than that of the SLM and PTS methods.

TABLE 3

Comparison of the computation complexity of SLM, PTS and the present method

| Method | Main calculation | Times of complex multiplication |
| --- | --- | --- |
| SLM, $M_1 = 32$ | IDFRFT with 32-time and 256-point, resulting in alternative 32 signals | 49152 |
| PTS, $M_2 = 32$, K = 4 | IDFRFT with 4-time and 256-point, resulting in alternative 32 signals | 6144 |
| The method of this invention, S = 32, L = 4 | IDFRFT with one time and 256-point, resulting in alternative 32 signals | 2560 |

Figure 6:
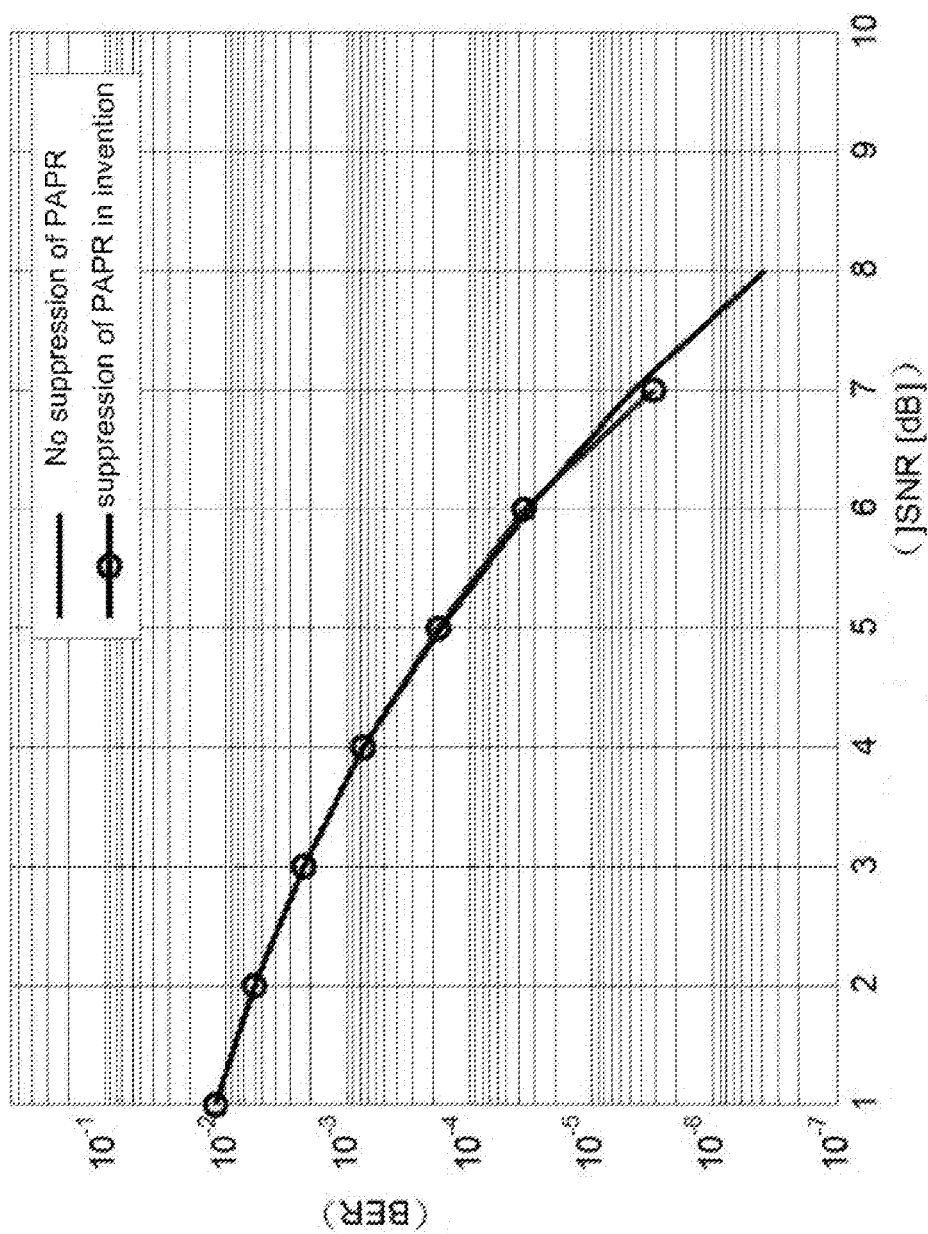
FIG. 6. Comparison of the BER performance with or without the PAPR reduction method of the present invention.

FIG. 6 is the comparison of the BER performance before and after the PAPR reduction method is introduced into an FRFT-OFDM system. From FIG. 6, it can be seen that the BER performance before and after the PAPR reduction method is introduced into an FRFT-OFDM system is quite similar. This shows that with the method of the invention, the receiving end can accurately recover the information of the sending end.

Figure 7:
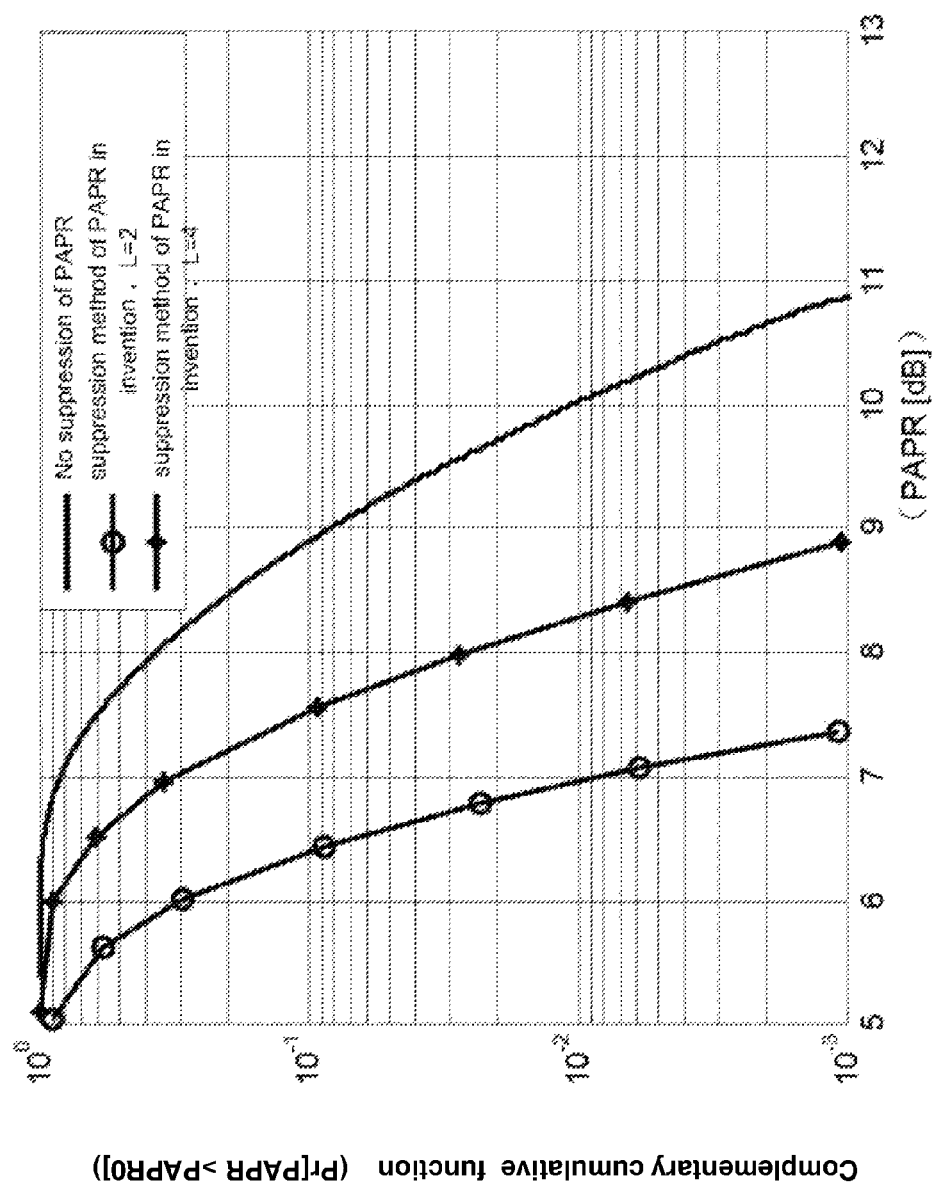
FIG. 7. Comparison of the PAPR reduction with the method of the present invention when L=2, 4.

FIG. 7 is the comparison of the PAPR reduction using the method of the present invention when L=2,4. From FIG. 7, it can be seen that the method can effectively improve the PAPR distribution of the system. When L=2, the PAPR of the system was reduced by about 2.0 dB than that without using PAPR suppression. When L=4 and CCDF=$10^{-3}$, the system PAPR is reduced by about 1.5 dB. It is shown in Table 1 that with the increasing value of L, the computational complexity of the method also increases accordingly.

Figure 8:
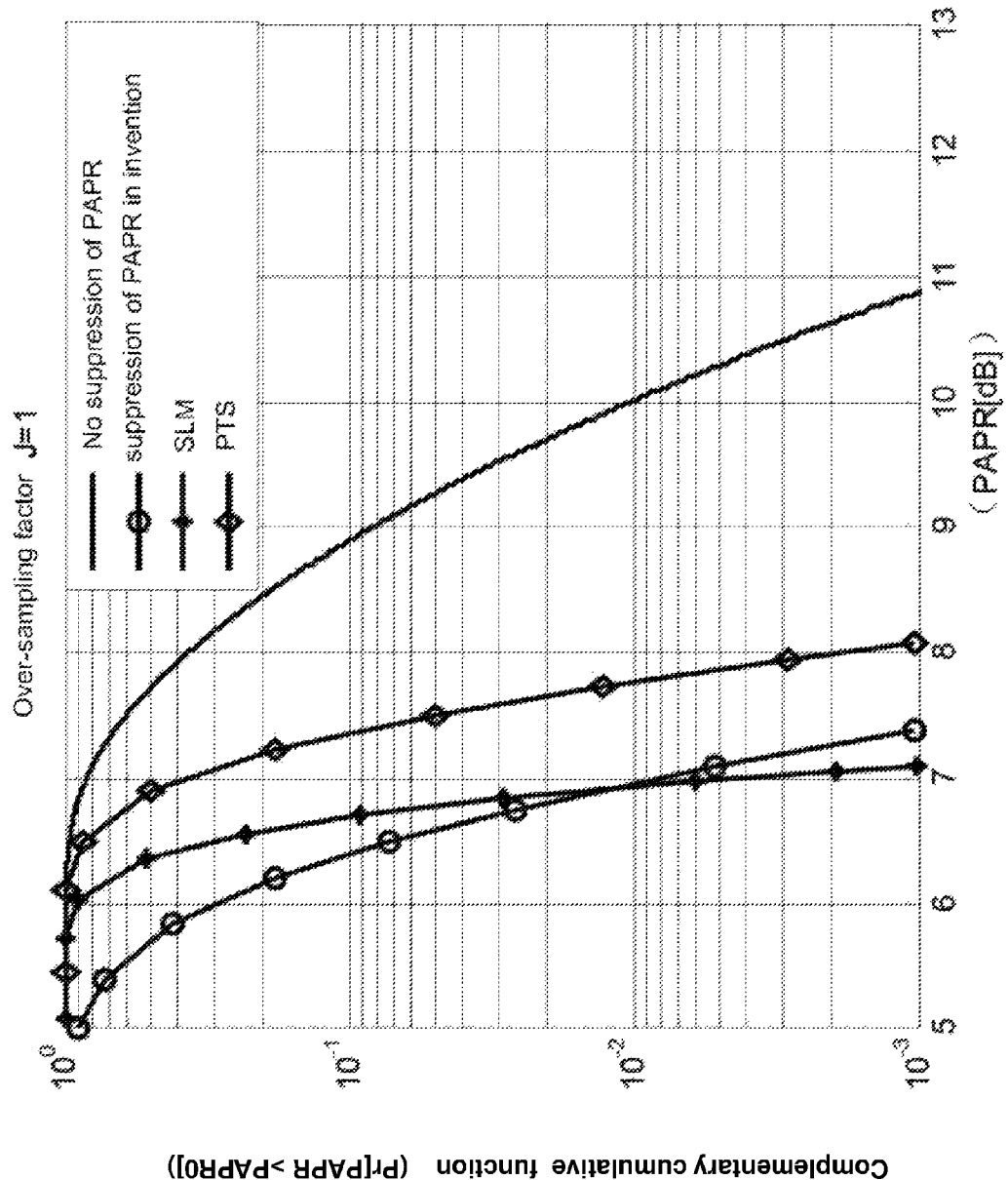
FIG. 8. Comparision of the PAPR reduction by the SLM method, the PTS method, and the method of the present invention when the number of candidate signals is 32 and the sampling factor J=1.

FIG. 8 is a comparison of the PAPR reduction by the SLM method, the PTS method, and the method of the present invention when the number of candidate signals is 32 and the sampling factor J=1. From FIG. 8, it can be seen that when CCDF=$10^{-3}$, the PAPR suppression effect of the present method is slightly worse than that of the SLM method. However, from the Table 3, it can be seen that the computational complexity of the present method is only 5.21% of the SLM method. When the number of candidate signal is 32 and the sampling factor J=1, the PAPR suppression effect of the present method is better than that of the PTS method. From the Table 3, it can be seen that the computational complexity of the present method is 41.67% of that of PTS.

Figure 9:
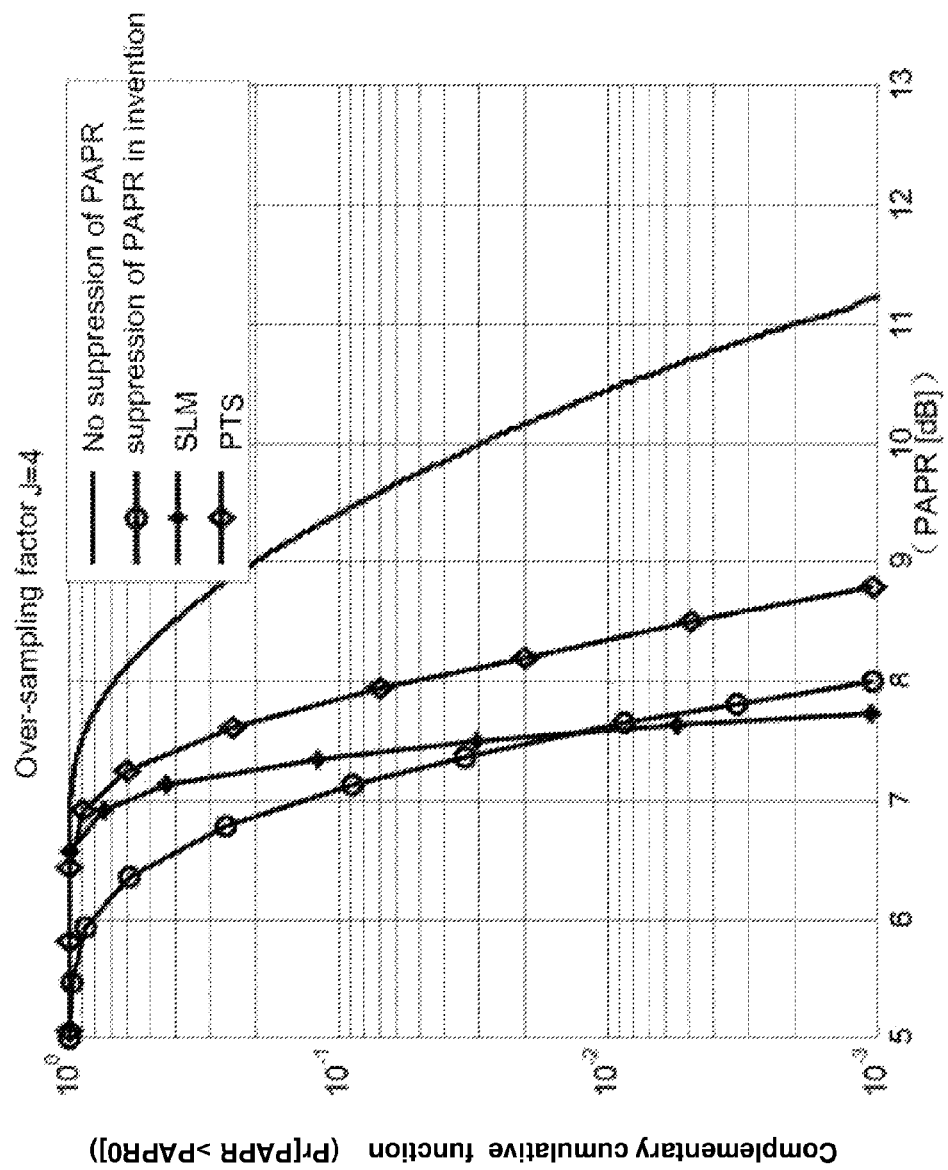
FIG. 9. Comparison of the PAPR reduction by the SLM method, the PTS method, and the method of the present invention when the number of candidate signals is 32 and the sampling factor J=4.

FIG. 9 is a comparison of the PAPR reduction by the SLM method, the PTS method, and the method of the present invention when the number of candidate signals is 32 and the sampling factor J=4. When computing the PAPR distribution characteristics of OFDM signals, using the sampling factor J=4 can closely simulate the continuous feature of OFDM signals. Comparing the PAPR distribution from FIG. 8 (sampling factor J=1) and FIG. 9 (sampling factor J=4), it can be seen that the PAPR of each method has about 0.5 dB increase when sampling factor is 4.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for reducing peak-to-average power ratio (PAPR) in a fractional Fourier transform-orthogonal frequency division multiplexing (FRFT-OFDM) communication system, comprising the steps of:
    1) at a transmitting end of the FRFT-OFDM communication system, performing an N-point inverse discrete fractional Fourier transform (IDFRFT) of digitalized complex input data X of length N and converting it into time domain to obtain FRFT-OFDM subcarrier signal x(n), wherein n is 1, 2, . . . , N;
    2) performing a p-order chirp periodic extension of the FRFT-OFDM subcarrier signal x(n) to obtain an extended chirp sequence, $x((n))_{P,N}$, wherein chirp refers to a linear frequency modulation and p is the order of Fractional Fourier Transform, and wherein conversion equation for the p-order chirp periodic extension is:

$$x(n-N)e^{j\frac{1}{2}\cot\alpha\square(n-N)^2\Delta t^2} = x(n)e^{j\frac{1}{2}\cot\alpha\square n^2\Delta t^2}$$

wherein $\alpha=p\pi/2$, $\Delta t$ is sampling interval;
    3) shifting $x((n))_{P,N}$ to right by iM (i is 1, 2, . . . , L) points to get $x((n-iM))_{P,N}$, which further multiplies by $R_N(n)$ to obtain chirp circular displacement of FRFT-OFDM signal, $x((n-iM))_{P,N}R_N(n)$, wherein L is the length of a random phase sequence; M=N/L, $$R_N(n) = \begin{cases} 1 & 1 \le n \le N-1 \\ 0 & \text{other} \end{cases};$$

4) multiplying $x((n-iM))_{P,N}R_N(n)$ by $$\eta(n, i) = e^{j\frac{1}{2}\cot\alpha[-2\pi iMn+(iM)^2]\Delta t^2}$$

point-by-point to obtain $\varphi(n,i)$ as the following:

$\varphi(n,i)=x((n-iM))_{P,N}R_N(n)\square\eta(n,i)$, $i=0,1\ldots L-1$,
$n=0,1,\ldots,N-1$ 5) multiplying $\varphi(n,i)$ by weighting factors, $r^{(l)}(i)$, and using a combiner to obtain candidate signals $\tilde{x}^{(l)}(n)$ of FRFT-OFDM in time domain as the following:

$$\tilde{x}^{(l)}(n) = \sum_{i=0}^{L-1} r^{(l)}(i)\square\varphi(n, i),$$

$n=0, 1 \ldots N-1, l=1, 2, \ldots S$ wherein $r^{(l)}(i)$ is a weighting factor with L-length, and S is the number of alternative Fractional random phase sequence;

6) transmitting a weighting factor $r(i)_{opt}$ that makes PAPR of candidate signals minimum as sideband information of FRFT-OFDM signals, wherein $$r(i)_{opt} = \underset{\{r^{(l)}(i),\ldots,r^{(s)}\}}{\mathrm{argmin}}\ PARP\ \{\tilde{x}^{(l)}(n)\}$$

8) using a Digital-to-Analog Converter to convert the transmitting FRFT-OFDM signals with minimum PAPR to analog signals which are further amplified by a High-Power Amplifier after modulated by carrier; and 9) submitting the amplified analog signals to a transmitting antenna.

* * * * *